United States Patent [19]

Jordan

[11] Patent Number: 4,720,961
[45] Date of Patent: Jan. 26, 1988

[54] CHICKEN SORTING DEVICE

[75] Inventor: C. Wane Jordan, Macon, Mo.

[73] Assignee: Conagra, Inc., Omaha, Nebr.

[21] Appl. No.: 818,611

[22] Filed: Jan. 13, 1986

[51] Int. Cl.⁴ .................... B65B 5/10; G01G 19/32
[52] U.S. Cl. ........................................ 53/502; 53/475;
                                                                   177/1
[58] Field of Search .................. 53/502, 77, 475, 473;
                                         177/1, 50, 25, 53, 121; 235/151.33

[56] References Cited

U.S. PATENT DOCUMENTS

| | | | |
|---|---|---|---|
| 2,470,916 | 5/1949 | Carruthers | 209/121 |
| 2,802,658 | 8/1957 | Hensgen et al. | 265/27 |
| 3,073,399 | 1/1963 | Durand | 177/53 |
| 3,311,182 | 3/1967 | Rusnack et al. | 177/45 |
| 3,416,619 | 12/1968 | McClusky | 177/53 |
| 3,416,620 | 12/1968 | McClusky | 177/123 |
| 3,620,317 | 11/1971 | Henry | 177/54 |
| 3,708,025 | 1/1973 | Soler et al. | 177/1 |
| 3,714,401 | 1/1973 | Yano | 235/151.33 |
| 3,939,928 | 2/1976 | Murakami et al. | 177/25 |
| 3,945,448 | 3/1976 | Sellers | 177/25 |
| 3,959,636 | 5/1976 | Johnson et al. | 235/151.33 |
| 3,977,483 | 8/1976 | Greanias | 177/1 |
| 4,065,911 | 1/1978 | Fagan | 53/53 |
| 4,123,970 | 11/1978 | Quante | 100/45 |
| 4,206,822 | 6/1980 | Mazzucchelli | 177/25 |
| 4,428,179 | 1/1984 | Jordan et al. | 53/502 |
| 4,548,286 | 10/1985 | Sashiki et al. | 53/502 X |
| 4,606,475 | 8/1986 | Usagawa | 53/502 X |

OTHER PUBLICATIONS

"Heat and Control News", Nov. 1981.

Primary Examiner—James E. Coan
Attorney, Agent, or Firm—Willian Brinks Olds Hofer Gilson & Lione Ltd.

[57] ABSTRACT

A device for filling a package with a predetermined weight of items, such as pieces of chicken, is disclosed. The device, under the control of a computer, sorts predetermined quantities of chicken pieces to a plurality of pockets each of which is adapted to transfer the predetermined quantities of chicken pieces sorted thereto so that they may be passed to a partially filled package, upon receipt of a control signal from the computer. The device, under the control of the computer, selects which of the pockets contains pieces of chicken which should be added to the partially filled package in order to bring the contents of that package up to the predetermined weight.

32 Claims, 5 Drawing Figures

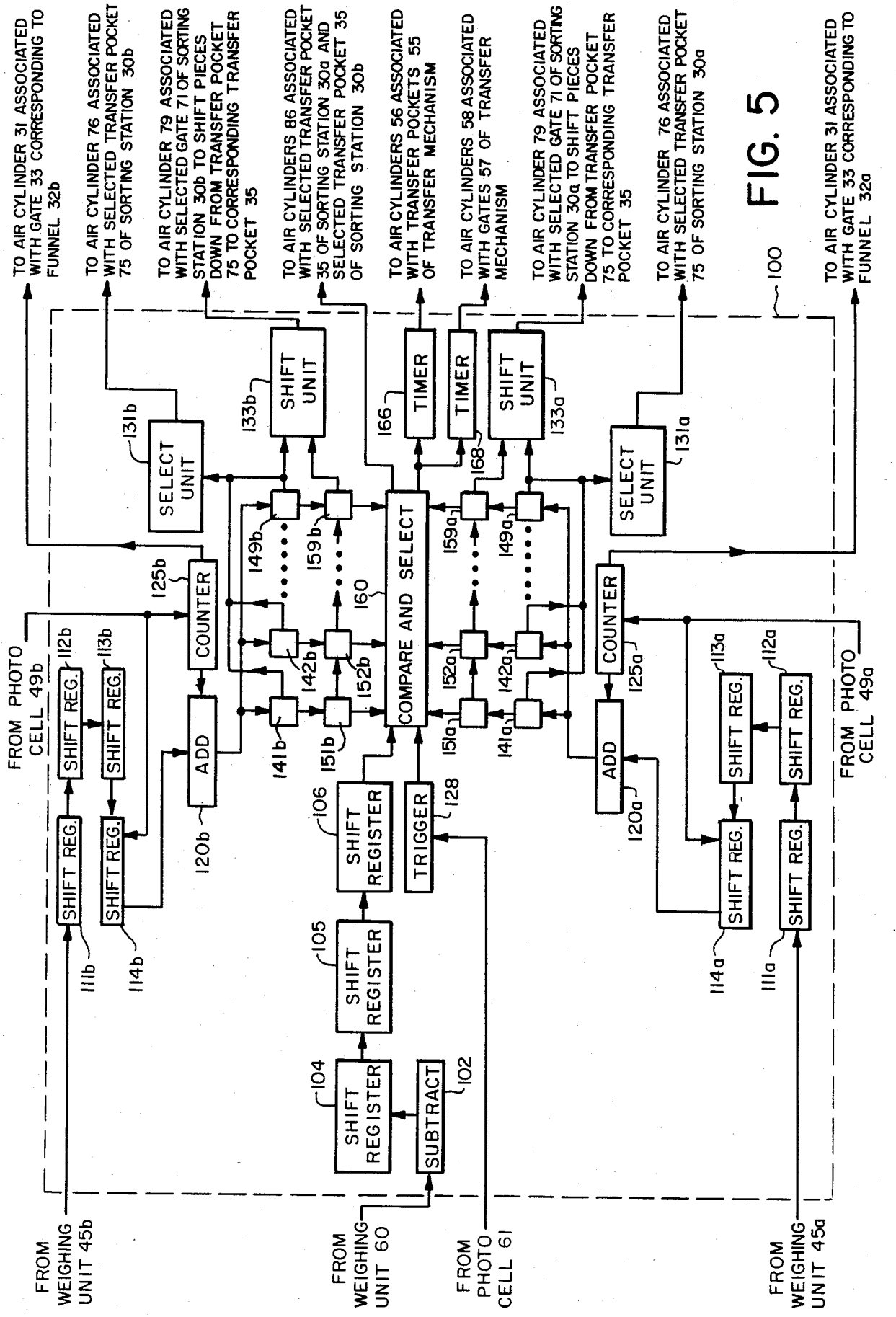

CHICKEN SORTING DEVICE

BACKGROUND OF THE INVENTION

This invention relates to a new and useful device which is adapted to package predetermined weights of irregularly shaped, different-sized items such as pieces of chicken. Though many automatic or substantially automatic packaging devices are known in the art, it appears that most of them relate to apparatus which package items which are of substantially the same size, i.e., items which are of a fungible and/or particulate nature.

The task of packaging different-sized items, such as pieces of chicken, is considerably more difficult for many reasons. For example, unlike fungible, particulate items, pieces of chicken are not readily "poured" from hoppers or other containers. Moreover, pieces of chicken are not interchangeable, but may vary in weight from nine to 200 grams.

It is thus a primary object of this invention to provide an improved device which substantially automatically packages predetermined weights of irregularly shaped, different-sized items such as pieces of chicken. It is another object of the invention to provide an improved device which packages such items relatively quickly, efficiently and inexpensively. A further object of the invention is to provide an improved method for packaging predetermined weights of irregularly shaped, different-sized items.

SUMMARY OF THE INVENTION

The foregoing objects, along with numerous features and advantages of the invention, are achieved in a device for filling a package with a predetermined weight of irregularly shaped, different-sized items. The device includes first weighing means for passing to a computer information relating to the weight of a first quantity of items in the package. The weight of this first quantity of items is less than the predetermined weight, and thus the package is only partially filled. The device further includes a plurality of pockets each of which is adapted to transfer items deposited therein to a discharge opening upon receipt of a control signal from the computer. Means for sorting the items to the plurality of pockets is also provided. The sorting means includes a second weighing means for passing to the computer information relating to the weight of each of the items. The computer passes a control signal only to a selected one of said pockets whose items, when combined with the first quantity of items in the package, most nearly equals said predetermined weight.

The foregoing objects, features and advantages of the invention may be further accomplished in a method for filling a package with a predetermined weight of irregularly shaped, different-sized items. The method contemplates providing to a computer first weight information relating to the weight of a first quantity of items in the package less than the predetermined weight. The method further contemplates feeding items one at a time to a receiving means and providing to the computer second weight information relating to the weight of each of said items being fed one at a time to the receiving means. The items are discharged from the receiving means when a predetermined quantity of said items are accumulated therein and then sorted to a plurality of pockets. Finally, the method also contemplates selecting which of the pockets contain items whose weight, when combined with said first quantity of items, most nearly equals said predetermined weight, and discharging the items from the selected pocket into the package on command from the computer.

BRIEF DESCRIPTION OF THE DRAWINGS

The invention summarized above can be best understood by reading the following detailed description in conjunction with the accompanying drawings in which:

FIG. 5 is a block diagram of the electronic circuitry which controls the invention exemplified in FIG. 1.

DETAILED DESCRIPTION OF AN EXEMPLARY EMBODIMENT

Figure 1:
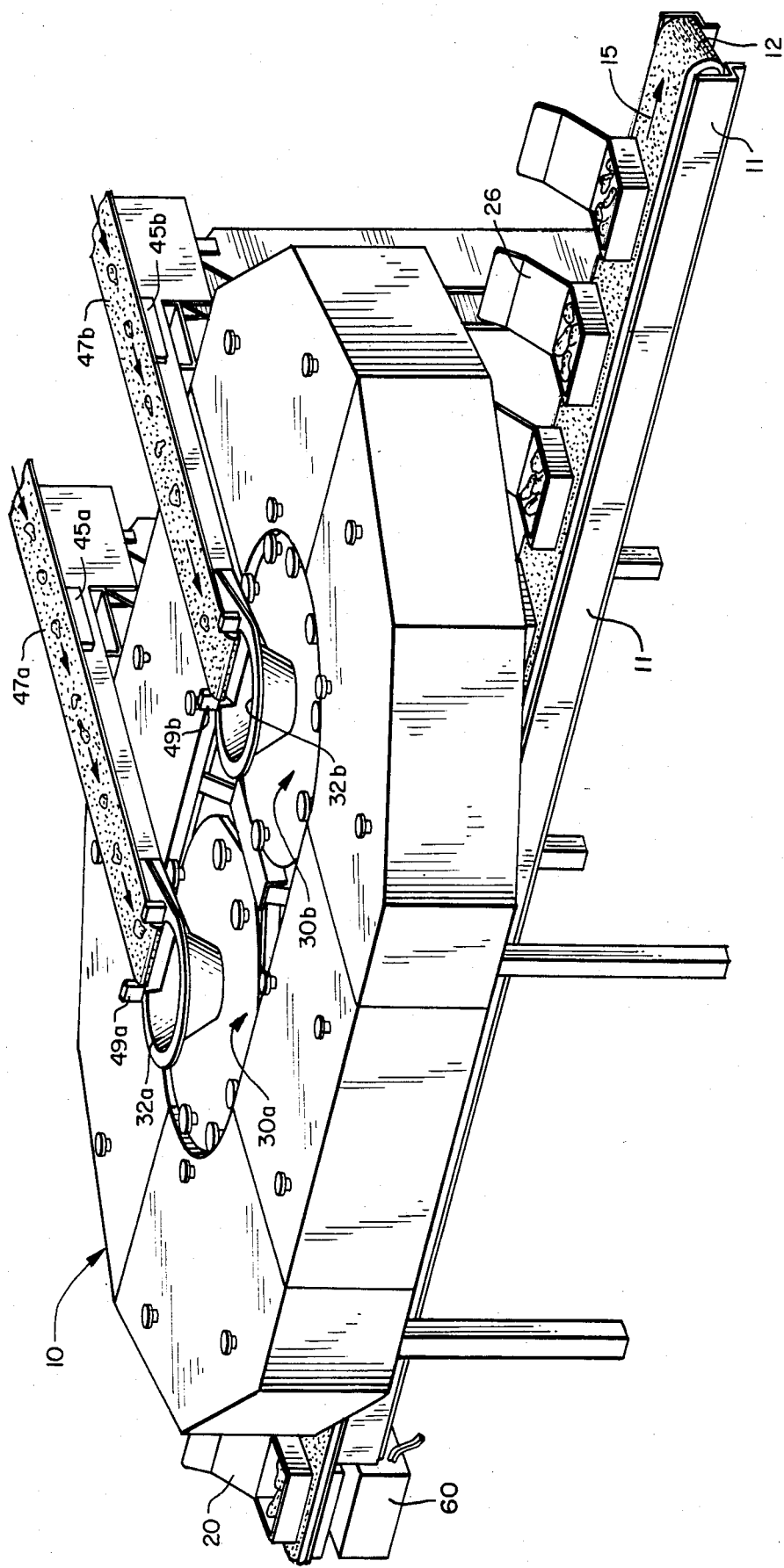
FIG. 1 is a perspective view of an exemplary embodiment of the invention.

Referring now to FIG. 1, a portion of an exemplary embodiment of a device for filling a package with a predetermined weight of irregularly shaped, different-sized items is represented generally by the reference numeral 10. The device 10 typically includes a pair of sorting stations 30a and 30b disposed above a conveyor 11 having an endless belt 12 driven by a power source (not shown). Endless belt 12 is adapted to carry a plurality of packages, represented in FIG. 1 by boxes 20–26, in the direction of arrow 15.

As noted above, device 10 is adapted to fill packages, such as boxes 20–26, with irregularly shaped, different-sized items. For purposes of this exemplary embodiment, these items are identified as pieces of chicken. The invention, however, should not be so limited, but should be accorded a scope commensurate with the appended claims. Moreover, depending on the capacity of the boxes 20–26, and the items with which they are to be filled, a "filled" box is defined as one which holds a predetermined weight of items. This predetermined weight may actually be a target weight, a predetermined range of weights, a predetermined minimum weight, etc. For example, in this exemplary embodiment, a predetermined weight of chicken is a target weight of 900 grams. Again, this should not be construed as limitative, the invention being defined by the appended claims.

In this exemplary embodiment, the target weight of 900 grams may be reached by packaging nine or ten pieces of chicken in each box. This is most expeditiously accomplished by initially putting seven pieces of chicken in each box, and then adding three additional pieces—two pieces from one station and one piece from the other station—to bring the total weight up to the target weight.

In addition, in the exemplary embodiment described herein, provision is made for a pair of sorting stations so that the package may be filled from two sources of items. This should not, however, be construed as limitative, but rather the invention should be accorded a scope commensurate with the appended claims. More particularly, the scope of the present invention encompasses not only the use of a pair of sorting stations, but also the use of only one sorting station or the use of more than two stations.

In operation, seven pieces of chicken are initially put into a package, such as box 20. This may be done manually or automatically. The partially filled box 20 is then transferred by conveyor 11 towards sorting stations 30a and 30b.

Before passing under sorting stations 30a and 30b the partially filled box is passed over package weighing means in the form of a weighing unit 60. In this exemplary embodiment, weighing unit 60 is an Icore Autochecker Checkweigher - Classifier 2000 Series, manufactured by the Icore Corporation of Mountain View, Calif. As explained in greater detail hereinafter, weighing unit 60 preferably determines the weight of the seven pieces of chicken previously placed in box 20, along with the weight of the box, and passes this weight information to controller or computation means in the form of a computer 100 shown in block form in FIGS. 5. In this embodiment, computer 100 is an Allen Bradley Model 2/30 Programmable Controller available from Allen Bradley, 747 Alpha Drive, Cleveland, Ohio 44143. As partially filled boxes of chicken, such as boxes 21-22 leave weighing unit 60 they then proceed via belt 12 of conveyor 11 toward sorting stations 30a and 30b. As a box enters a filling area under sorting stations 30a and 30b it passes sensing means in the form of a selector photo cell 61 just before reaching sorting stations 30a and 30b.

Photo cell 61 is positioned along belt 12 of conveyor 11 at a preset distance in advance of a filling position F situated along conveyor 11 and below sorting stations 30a and 30b. When so positioned, photo cell 61 is adapted to apply an activating signal to computer 100 indicative of the proximity of box 22 to the filling position F situated below sorting stations 30a and 30b. Photo cell is preferably Model No. ML54A manufactured by the Micro Switch Division of Minneapolis Honeywell Corp. in Freeport, Ill. After receiving the activating signal from selector photo cell 61, the computer 100 calculates the additional weight of chicken which must be added to box 22 in order to bring the net weight of chicken contained therein up to the predetermined or target weight. This typically requires the addition of three pieces of chicken.

Sorting stations 30a and 30b, which are disposed above conveyor 11, are each comprised of a funnel, an upper sorting level, a lower sorting level and a transfer mechanism. Simultaneously with the movement of boxes, such as boxes 20-26 along conveyor 11, parts or pieces are dumped in bulk on to parts aligning machines (not shown) for subsequent passage to sorting stations 30a and 30b, respectively. In this exemplary embodiment, parts aligning machines are vibratory conveyors, manufactured by Key Technology, Inc. of Milton-Freewater, Oreg. From each of the parts aligning machines, the parts come out in a single file (one part behind the other) on to feed conveyors 47a and 47b. The conveyors 47a and 47b operate at a higher rate of speed than the rate at which parts are discharged from the parts aligning machines so that the higher speed conveyors cause, preferably, a minimum of a four inch spacing between each of the parts. The parts being carried by the conveyors 47a and 47b are then passed over weighing means in the form of weighing units 45a and 45b. In this exemplary embodiment weighing units 45a and 45b are each an Icore Autochecker Checkweigher - Classifier 2000 Series, manufactured by the Icore Corporation of Mountain View, Calif.

As explained in greater detail hereinafter, weighing units 45a and 45b preferably determine the weight of each part and pass this weight information to the computer 100 shown in block form in FIG. 5. After parts are passed over weighing units 45a and 45b they then continue on feed conveyors 47a and 47b that serve to drop the individual pieces in to the funnels 32a and 32b of the sorting station 30a and 30b, respectively. Photo cells 49a and 49b are positioned at the end of the feed conveyors 47a and 47b. When so positioned, photo cells 49a and 49b are adapted to check each part crossing the photo cell and apply a counter signal to computer 100 indicative that a part has crossed the photo cell and dropped into the funnel. Photo cells 49a and 49b are preferably Model No. ML54A manufactured by the Micro Switch Division of Minneapolis Honeywell Corp. in Freeport, Ill.

In a manner explained in greater detail hereinafter, computer 100 keeps track of the number of pieces crossing photo cells 49a and 49b and the weight of each piece. When a predetermined quantity of items has passed by photo cells 49a and 49b and dropped into funnels 32a and 32b, computer 100 causes a signal to be applied to an air cylinder 31 associated with each funnel. See FIG. 4. Each air cylinder 31 is operatively linked to a gate 33 and is activated by the signal. In this exemplary embodiment, the air cylinders 31 are Tom Thumbs, manufactured by Air Hydraulics Ph.D. Inc., P.0. Box 9070T, Ft. Wayne, Ind. and have a 6 inch stroke. When activated, the air cylinders 31 pull open associated gates 33 positioned directly under the lower openings of the funnels 32a, 32b so that the predetermined quantities of additional items are discharged from the funnels into the upper sorting levels 34 of the sorting stations.

Figure 3:
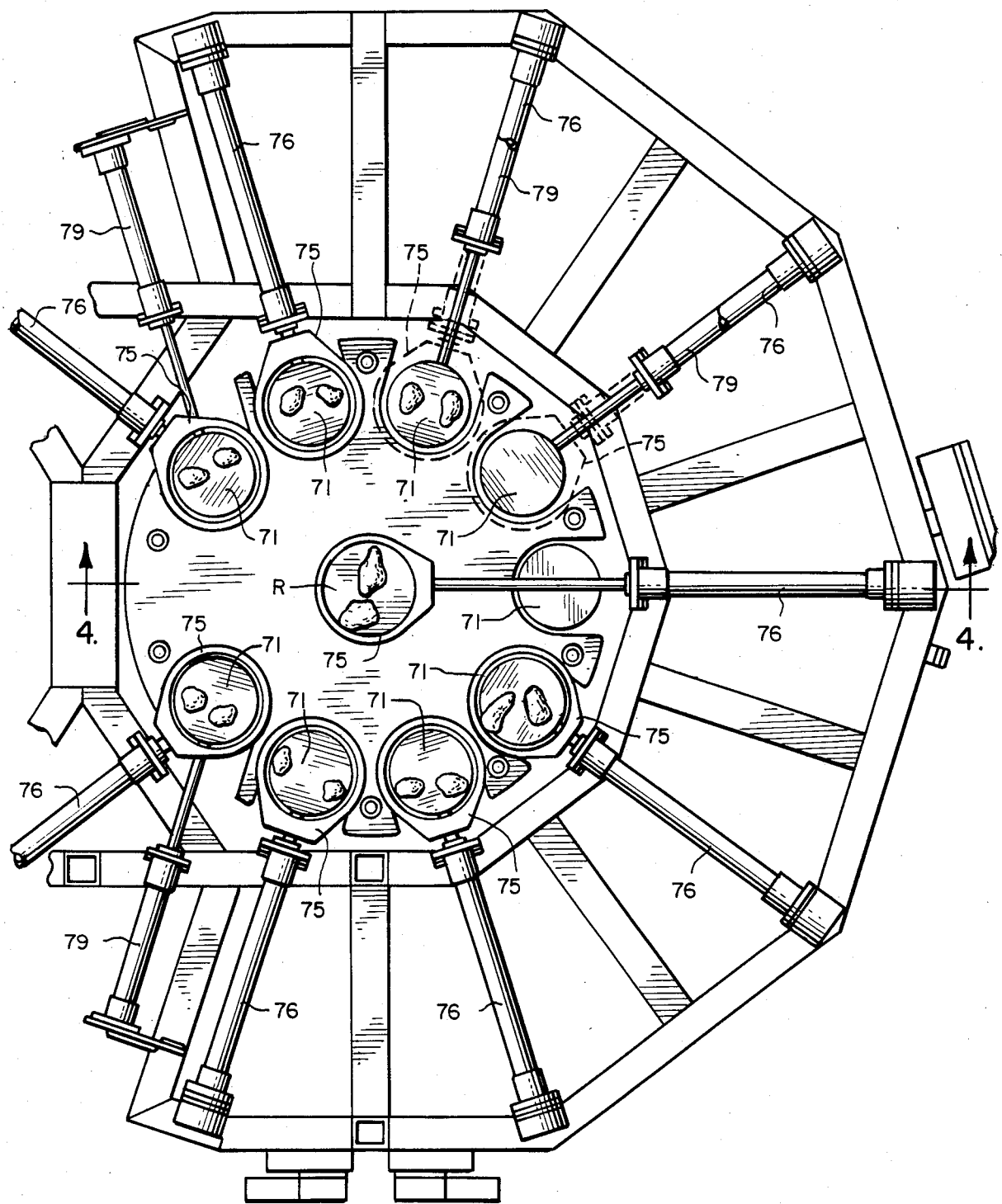
FIG. 3 is a top plan view of a portion of the upper sorting level of the exemplary embodiment of the invention shown in FIG. 1.

As best shown in FIG. 3, upper sorting levels 34 of the sorting stations each comprise a plurality of gates 71. FIG. 3 shows the upper sorting level 34 of sorting station 30b. The upper sorting level 34 of sorting station 30a is the same as shown for sorting station 30b. Though in this exemplary embodiment, nine such gates are employed, any suitable number may be utilized. The gates 71 are arranged in a circular pattern. A receiving position R is located at the center of the circular pattern formed by each arrangement of gates 71 directly below each lower opening of the funnel. Upper levels 34 of each sorting station 30a, 30b each also include a plurality of transfer pockets 75, each of which is associated with a corresponding one of the gates 71. Each of the transfer pockets is adapted to receive the predetermined quantity of items dropped from funnels 32a, 32b, respectively, and transfer them to its associated gate. In this exemplary embodiment, the transfer pockets are 6½ inches in diameter and 5 inches in height.

Actuation means in the form of air cylinders 76 are operatively linked to corresponding transfer pockets 75. In operation, when any of the air cylinders 76 is activated the associated transfer pocket is pushed forward from its position above the corresponding gate to the receiving position R permitting the pieces discharged from the funnel to fall into the transfer pocket. See FIG. 3. Once the transfer pocket receives the pieces, the air cylinder retracts and the transfer pocket, along with the pieces deposited and maintained therein, is returned to the position above the corresponding gate. In this exemplary embodiment, the air cylinders 76 are Tom Thumbs manufactured by Air Hydraulics Ph.D. Inc., P.O. Box 9070T, Ft. Wayne, Ind. and have a stroke of 11½ inches. After the transfer pocket returns to its position above its corresponding gate, another air cylinder associated with a transfer pocket not holding any parts is activated and pushed forward so that the associated transfer pocket similarly receives another quantity of items discharged from the corresponding funnel 32.

Gate actuator means in the form of air cylinders 79 are operatively linked to corresponding gates 71. When any of the air cylinders 79 is activated, it retracts and the associated gate 71 is pulled open thereby permitting the pieces deposited and maintained within the associated transfer pocket to be discharged from the upper sorting level 34 and dropped into the lower sorting level 36. In this exemplary embodiment, the air cylinders 79 are Tom Thumbs manufactured by Air Hydraulics Ph.D. Inc., P.O. Box 9070T, Ft. Wayne, Ind., and have a 6 inch stroke.

The lower sorting levels 36 of the sorting stations 30a, 30b, respectively, each comprise a plurality of transfer pockets 35 (see FIG. 4) arranged in a circular pattern. Each of the transfer pockets 35 is associated with a corresponding one of the gates 71 and is located below the associated gate. At the center of each of the circular patterns of transfer pockets 35 of the lower sorting levels, a discharge opening D is provided. See FIG. 4. Each of the transfer pockets 35 is adapted to receive the items discharged from its associated upper level gate. As is more fully described below, each transfer pocket 35 is also adapted to transfer the items received from the upper level 34 to the discharge opening D whereupon the items deposited and maintained therein are then discharged from lower sorting level 36 to the transfer mechanism 38.

Actuation means in the form of air cylinders 86 are operatively linked to corresponding transfer pockets 35 of lower level 36 for each sorting station 30a, 30b. When activated by a control signal from computer 100, the associated transfer pocket to which the air cylinder is operatively linked is pushed forward from its position below the corresponding upper level gate to the discharge opening D. In this exemplary embodiment, the air cylinders 86 are Tom Thumbs manufactured by Air Hydraulics Ph.D. Inc., P.O. Box 9070T, Ft. Wayne, Ind., and have a stroke of 11½ inches.

In a manner explained in greater detail hereinafter, computer 100 determines which one of the lower level transfer pockets 35 of sorting station 30a and which one of the lower level transfer pockets 35 of sorting station 30b, have pieces of chicken deposited and maintained therein which, when combined with the seven pieces of chicken already in a partially filled box, such as box 22, will bring the contents of that box up to the target weight of 900 grams. After the computer 100 determines which combination of lower level transfer pockets—one from sorting station 30a and one from sorting station 30b—are to be selected, it causes a control signal to be applied to the air cylinders associated with the selected transfer pockets. This, in turn, causes the pieces of chicken to be dumped from the lower sorting level transfer pockets associated with the selected air cylinders into the associated transfer mechanisms 38 via discharge opening D.

Figure 2:
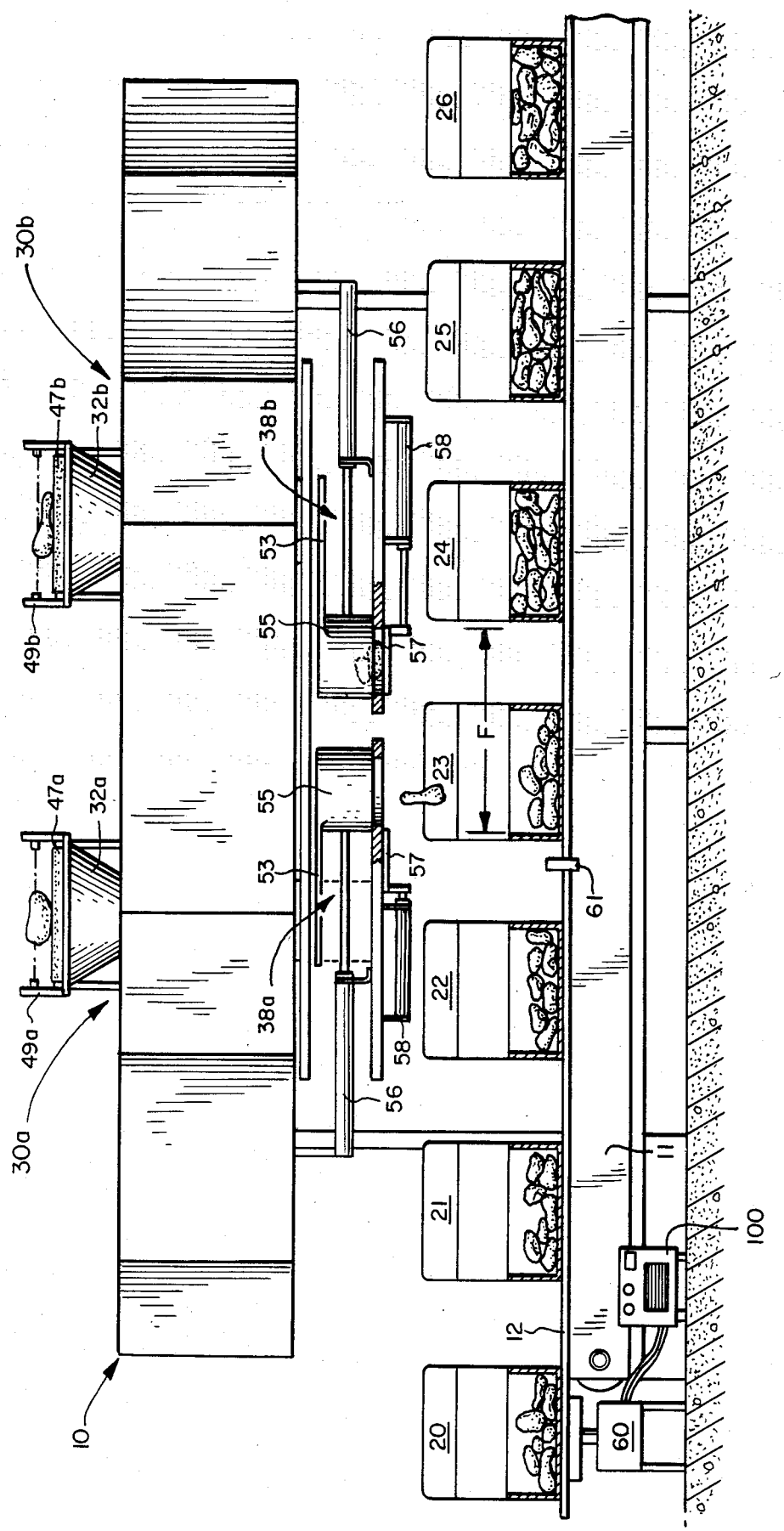
FIG. 2 is a side view of the exemplary embodiment of the invention shown in FIG. 1.
Figure 4:
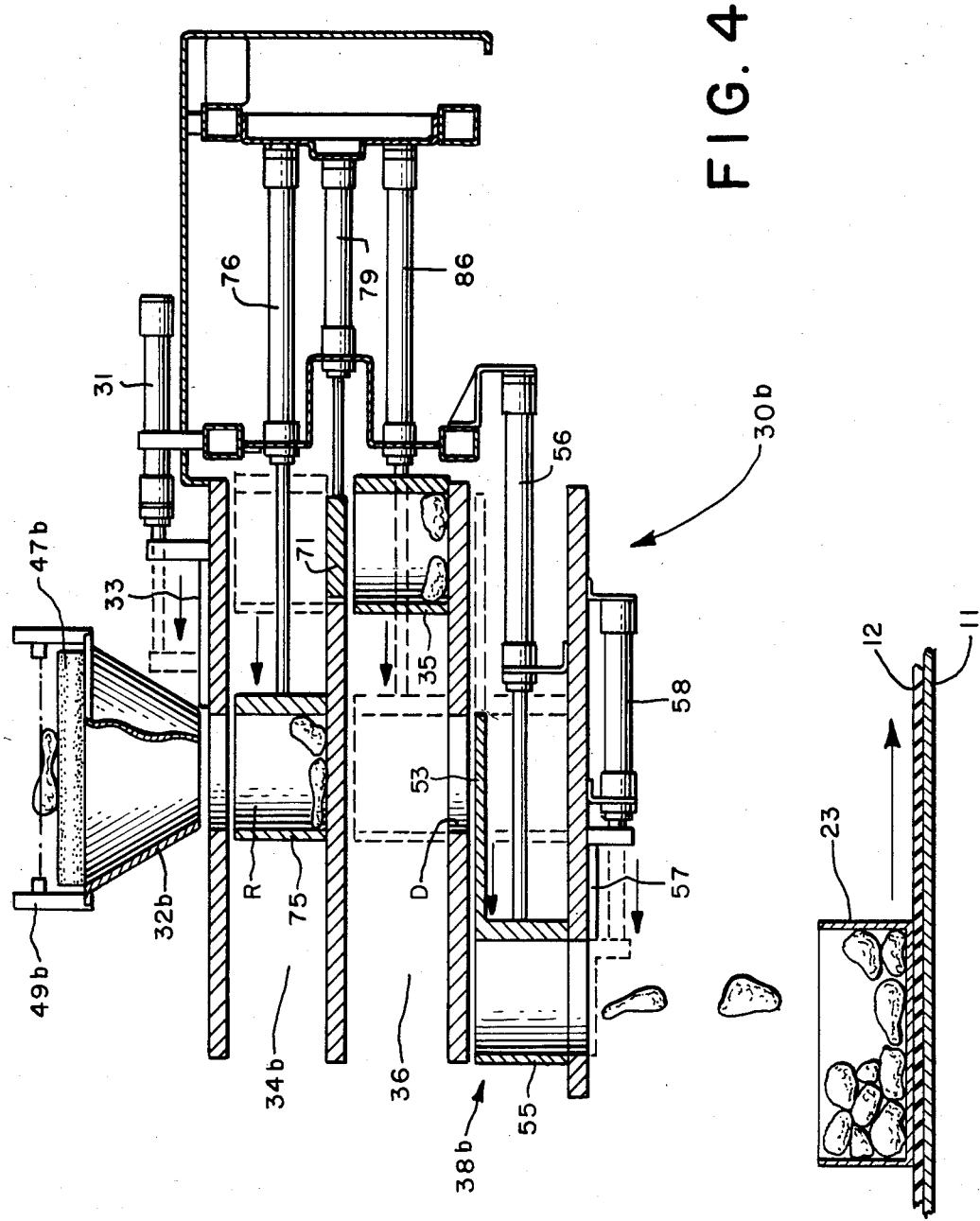
FIG. 4 is a cross-sectional view of one sorting station of the exemplary embodiment taken along the line 4—4 of FIG 3.

As shown best in FIGS. 2 and 4, the transfer mechanisms 38a and 38b each comprise a transfer pocket 55 and a gate 57. Air cylinders 56, which are Tom Thumbs manufactured by Air Hydraulics Ph.D. Inc., P.O. Box 9070T, Ft. Wayne, Ind. and having an 11½ inch stroke are operatively linked to each transfer pocket 55 and air cylinders 58 are operatively linked to each gate 57. When pieces dropped from discharge opening D of each lower sorting level 36 enter associated transfer pocket 55, each air cylinder 56 is activated and the associated transfer pocket 55 is pushed forward so that the pieces deposited and maintained therein are transferred to a position above corresponding gate 57. After each transfer pocket 55 is pushed forward and the pieces deposited therein have come to rest, associated air cylinder 58 is activated and gate 57 slides open thereby causing the pieces to drop into the box 23. The gates 57 are opened such that the pieces from each pocket 55 are dropped into the box 23 as it moves along conveyor 11. Gate 57 of transfer mechanism 38b is opened at a predetermined time after gate 57 of transfer mechanism 38a is opened in order to account for the movement of box 23 along conveyor 11 during dropping, thereby permitting pieces to be dropped from sorting stations 30a, 30b in a straight down direction while boxes are continuously moved along by conveyor 11.

It should be appreciated that the use of gates 57 allows time for the pieces in their associated pocket 55 to come to rest thereby allowing the pieces to fall straight down into the box 23. This straight down action allows pieces to be dropped from sorting stations 30a and 30b into the box 23 without having to pause or momentarily arrest the box 23. This also enables the fall distance to the box to be kept to a minimum which aids in preventing breaking or distortion of pieces when pieces fall into and hit the box. The use of transfer mechanisms 38a, 38b also allows dumping of pieces to be made from each sorting station 30a, 30b into the same box. As shown in FIGS. 2 and 4, transfer pockets 55 are each provided with a trailing gate 53 that serves to prevent any items from entering the transfer mechanism level from the lower sorting level while transfer pocket 55 is transferring items to gate 57. This enables another selection to take place on the associated lower sorting level 36 before the transfer pocket 55 returns to its position below corresponding discharge opening D.

Referring now to FIG. 5, the operation of the device 10, particularly as it is controlled by computer 100, is explained in greater detail. As noted above, seven pieces of chicken are deposited in each of the boxes, as they start moving along belt 12 of conveyor 11. When one of these boxes, such as box 20, reaches weighing unit 60, weight information is determined and passed to computer 100. More particularly, as shown in FIG. 5, the weight of box 20 plus the weight of the seven pieces of chicken initially deposited therein, is applied to a subtract unit 102 of computer 100. Subtract unit 102 of computer 100 subtracts the weight of box 20 and the pieces initially deposited therein from the target or predetermined weight, yielding a difference weight which is applied, in binary coded decimal form, to a shift register 104. The difference weight is the additional weight of chicken which must be added to the box 20 in order to bring the net weight of chicken contained therein up to the target or predetermined weight.

Shift register 104 is but one of three serially coupled shift registers identified by reference numerals 104–106, respectively. Shift register 106, the last in the series is coupled to a compare and select unit 160. In accordance with well-known shift register operation, the difference weight information relating to a particular box moving along belt 12 between weighing unit 60 and selector photo cell 61 is applied to shift register 104, and is immediately cycled through shift registers 105 and 106 ultimately being stored in the latter. When difference weight information relating to a subsequent box is passed to computer 100 via weighing unit 60, that information is cycled through shift registers 104 and 105 ultimately being stored in the latter because shift register 106 is still occupied.

When difference weight information in shift register 106 is cleared, the weight information previously stored in shift register 105 advances to shift register 106. Since shift register 106 is not cleared until after an activating signal is applied to computer 100 from photo cell 61, the box corresponding to the difference weight information stored in shift register 106 will always be the box that is immediately downstream from photo cell 61. In FIG. 2, that box is box 22.

Simultaneously with the movement of boxes 20-26 along belt 12 of conveyor 11, predetermined quantities of chicken pieces are accumulated in funnels 32a and 32b as they drop off one at a time from feed conveyors 47a and 47b. When single pieces reach weighing units 45a and 45b, weight information is determined and passed to computer 100. More specifically, as shown in FIG. 5, the weight of each piece of chicken traveling to sorting station 30a is applied, in binary coded decimal form to a shift register 111a and the weight of each piece of chicken traveling to sorting station 30b is applied, in binary coded decimal form to a shift register 111b.

Shift registers 111a and 111b, respectively, are but one of four serially coupled shift registers identified by reference numerals 111a-114a and 111b-114b, respectively. In accordance with well-known shift register operation, the weight information relating to a particular piece of chicken moving along feed conveyor 47a, 47b is applied to shift register 111a, 111b, and is immediately cycled through associated shift registers 112, 113, and 114, ultimately being stored in the latter. When weight information relating to a subsequent piece of chicken is passed to computer 100 via weighing units 45a, 45b, that information is cycled through shift registers 111, 112 and 113, ultimately being stored in the latter because shift register 114 is still occupied. When the weight information in shift registers 114a, 114b are cleared, the weight information previously stored in shift registers 113a, 113b, respectively, advances to associated shift register 114a, 114b. Since shift registers 114a, 114b are not cleared until after activating signals are applied to computer 100 from photo cells 49a and 49b, the pieces corresponding to the weight information stored in shift registers 114a, 114b will always be the pieces that are immediately downstream from photo cells 49a and 49b, respectively.

After activating signals are applied to computer 100 from photo cells 49a, 49b, the weight information stored in the shift registers 114a and 114b are cycled to and applied to add units 120a, 120b. At the same time an activating signal from photo cell 49a, 49b is also applied to counter units 125a, 125b. As subsequent activating signals are applied from photo cell 49a, 49b, weight information is applied from shift registers 114a, 114b to add units 120a, 120b, respectively. When a predetermined count indicative of the predetermined quantity of items from each station to be passed to box 22 is reached by counter units 125a, 125b, the information stored in add units 120a, 120b, representative of the weight of the pieces of chicken deposited in funnels 32a, 32b are cycled through, respectively, to one of storage units 141a-149a and one of storage units 141b-149b. Simultaneously, counter units 125a, 125b each pass a control signal to air cylinders 31 associated with gates 33 corresponding to funnels 32a, 32b, thereby causing gates 33 to open so that the chicken deposited in funnels 32a, 32b is dumped from the funnels to the upper sorting level. Each of the nine storage units corresponds to one of the transfer pockets 75 of the upper sorting levels 34 of sorting stations 30a, 30b, respectively. Storage units 141a-149a and 141b-149b are coupled to select units 131a and 131b, respectively, of computer 100 which serve to select which one of transfer pockets 75 of upper sorting level 34 of sorting station 30a and which one of transfer pockets 75 of upper sorting level 34 of sorting station 30b are available to receive the items to be dropped from funnels 32a and 32b. Select units 131a 131b, then apply an activating signal to the proper air cylinders 76 associated with the selected ones—one from each station—of transfer pockets 75, thereby causing the selected transfer pockets 75 to be pushed forward to receiving position R to receive pieces dropped from funnels 32a and 32b respectively. When weight information relating to a subsequent quantity of items deposited in funnels 32a and 32b is passed from add units 120a, 120b, that information is cycled to the next available storage unit and so on in the same fashion.

Storage units 141a-149a and 141b-149b are each coupled to corresponding storage units 151a-159a and 151b-159b, respectively. Storage units 151a-159a and 151b-159b, in turn, are linked to select units 133a and 133b of computer 100. Each of the storage units 151-159 corresponds to one of the transfer pockets 35 of the lower sorting levels 36 of sorting stations 30a and 30b. As items are dumped by funnels 32a 32b in to the upper sorting level, shift units 133a, 133b of the computer 100 check the status of the transfer pockets 35 of the lower sorting level of sorting stations 30a, 30b. If empty, the transfer pocket 35 is filled from the upper level. When storage units 151a14 159a, 151b-159b are clear, indicating that the associated lower sorting level transfer pocket is empty, shift units 133a, 133b cause the weight information previously stored in the corresponding storage unit 141a-149a, 141b-149b, respectively, to advance to the corresponding one of storage units 151a-159a, 151b-159b. As the information is so shifted, an activating signal is passed from shift units 133a, 133b of computer 100 to the air cylinders 79 corresponding to the storage unit of storage units 141a-149a, 141b-149b, respectively which is cycled thereby causing the associated gate 71 to open and items are dropped from the upper level to the lower sorting level. Each time such a shift or transfer is made between the upper and lower sorting levels, the transfer pockets 75 of the upper level are then free to go back under the funnels 32a, 32b, respectively, to receive more items.

As shown in FIG. 5, difference weight information from shift register 104 is passed to compare and select unit 160. Compare and select unit 160 is also coupled to shift registers 151a-159a and 151b-159b, receiving therefrom signals corresponding to the weight of the pieces held in the lower sorting level transfer pockets of sorting stations 30a and 30b.

The additional weight of chicken that must be added to box 22 to bring its contents up to the target weight is then compared with the weight of each of the quantity of items held in the lower level transfer pockets 35 of sorting station 30a and sorting station 30b. Compare and select unit 160 selects which one of transfer pockets 35 of sorting station 30a and which one of transfer pockets 35 of sorting station 30b hold the quantities of items which when combined and added to the partially filled box 22, will bring the contents of that box most nearly up to the target or predetermined weight.

When box 22 reaches selector photo cell 61, the latter passes an activating signal to a trigger unit 128. Trigger unit 128, in turn, develops a trigger signal which is applied to select unit 160. Upon receipt of the trigger signal, compare and select unit 160 applies a control signal only to those of air cylinders 86 associated with the selected ones—one from each station—of transfer pockets 35. Upon receipt of a control signal, the appropriate one of air cylinders 86 from each station is activated, causing the individual pieces of chicken previously deposited and maintained in each of the selected transfer pockets 35 to be transferred to the respective discharge opening D where they drop through and out of discharge opening funnel into the corresponding transfer pocket 55 of transfer mechanisms 38a, 38b, respectively, as soon as such dropping action is not prevented from occurring by associated trailing gates 53.

The movement of belt 12 of conveyor 11 is timed so that a partially filled box of chicken reaches the filling position F of box 23, just as the two quantities of additional pieces of chicken are dropped from the transfer mechanisms 38a, 38b and more specifically, when gates 57 are opened. Compare and select unit 160, at the time it passes the aforementioned control signal to the selected air cylinders 86, also passes signals, which are passed via conventional timing circuits 166 and 168, to air cylinders 56 and 58, respectively. Air cylinders 56 and 58 are, as described above, operatively linked, respectively, to each of the transfer pockets 55 and gates 57. When activated, air cylinders 56 push the associated transfer pocket 55 forward to gate 57. In turn, air cylinders 58 are activated, after the items deposited and maintained in transfer pockets 55 have come to rest above associated gates 57. When activated, air cylinders 58 slide each gate 57 open and the pieces from transfer pockets 55 are dropped directly into box 23 which passes under gates 57 at the same time. As described above, gate 57 of transfer mechanism 38b is opened at a predetermined time after gate 57 of transfer mechanism 38a is opened in order to account for the movement of box 23 along conveyor 11 during dropping. It should be appreciated that timing circuit 168 and gates 57 allow the pieces in associated transfer pockets 55 to come to a complete rest so that when gates 57 are opened the pieces fall straight down into box 23. This straight down dropping action allows pieces to be dropped into box 23 without having to pause box 23 on belt 12 of conveyor 11.

Similarly, it should also be appreciated that each gate is used in the device 10 to ensure that all forward momentum of pieces is stopped. This enables transfers downward from one level to the next in a straight down direction. This also enables the fall distance or drop distance to the box to be kept at a minimum. This aids in preventing breaking or distortion of pieces when pieces hit the box. Moreover, since the transfer pockets of the upper and lower sorting levels are arranged in a circular pattern the time for movement of pieces from one location to another is always the same regardless of which transfer pocket is selected. Furthermore, it should be appreciated that the upper and lower sorting levels of each station operate at substantially the same time so that parts may be received from the funnels and sorted by the upper sorting levels at substantially the same time as selections are being made on the lower sorting level. In this regard, it should be appreciated that the use of the upper sorting levels 34 and the lower sorting levels 36 has the advantage of permitting sorting of pieces from the respective funnels 32a, 32b, on the upper sorting levels 34 to take place independently and at the same time that selection of the appropriate transfer pockets 35 on the lower sorting level 36 occurs. In addition, the use of two feeding conveyors permits different parts to be fed to each of the sorting stations if desired.

By the time a completely filled box moves out from under gates 57 and filling position F, compare and select unit 160 then selects which of transfer pockets 35 of sorting stations 30a and 30b holds the pieces of chicken which should be dropped into the trailing box.

What has been described is a novel device for filling a package with a predetermined weight of irregularly shaped, different-sized items such as pieces of chicken. Numerous modifications or refinements of this device, or the methods associated therewith, which do not part from the scope of the invention, may become apparent to those skilled in the art. All such modifications and refinements are intended to be covered by the appended claims.

I claim:

1. An apparatus for filling a package with a predetermined weight of irregularly shaped, different sized items comprising:
   controller means;
   first weighing means for passing to said controller means information relating to the weight of a first quantity of items in said package, said weight of said first quantity of items being less than said predetermined weight;
   a plurality of pockets each adapted to transfer items deposited therein to a discharge opening upon receipt of a control signal so that said items deposited therein are passed to said package;
   means for sorting said items to said plurality of pockets, said means comprising a plurality of gates each associated with a corresponding one of said pockets and a plurality of transfer means each associated with a corresponding one of said gates, each of said transfer means adapted to transfer items to said associated gate upon receipt of a signal from said controller means and each of said gates adapted to open upon receipt of a signal from said controller means thereby causing said items transferred to said gate by said associated transfer means to be released into said associated pocket, said means for sorting including second weighing means for passing said controller means information relating to the weight of each of said items;
   said controller means passing a control signal only to a selected one of said pockets whose items, when combined with said first quantity of items in said package, most nearly equals said predetermined weight.

2. The apparatus of claim 1 wherein said sorting means further comprises receiving means for accumulating items adapted to discharge said items when a predetermined quantity of items are accumulated therein and means for feeding said items one at a time to said receiving means.

3. The apparatus of claim 2 wherein each of said transfer means is adapted to receive said items discharged from said receiving means.

4. The apparatus of claim 3 wherein said controller means passes said signal to a selected one of said transfer means which is empty.

5. The apparatus of claim 3 wherein said controller means passes said signal to a selected one of said gates whose associated pocket is empty.

6. The apparatus of claim 3 wherein said receiving means comprises a funnel having a funnel gate which opens upon receipt of a signal from said controller means.

7. The apparatus of claim 6 wherein said controller means passes said signal to said funnel gate at a selected time after said predetermined quantity of items have been accumulated.

8. The apparatus of claim 3 further comprising a transfer station disposed below said discharge opening adapted to receive said items discharged from said discharge opening and transfer said items to said package.

9. The apparatus of claim 8 wherein said transfer station comprises a transfer pocket and a gate, said transfer pocket adapted to receive said items discharged from said discharge opening and transfer said items to said gate, said gate adapted to open thereby causing said items to be discharged from said transfer station to said package.

10. The apparatus of claim 9 wherein said transfer pocket includes means to prevent additional items from being discharged from said discharge opening while said transfer pocket is transferring said items to said gate.

11. The apparatus of claim 10 wherein said gate is adapted to open at a selected time after said transfer pocket has transferred said items to said gate.

12. A method for filling a package with a predetermined weight of irregularly shaped, different sized items, said method comprising the steps of:
  (a) providing to computation means first weight information relating to the weight of a first quantity of items in said package less than said predetermined weight;
  (b) feeding items one at a time to a receiving means;
  (c) providing to said computation means second weight information relating to the weight of each of said items being fed one at a time to said receiving means;
  (d) discharging items from said receiving means when a predetermined quantity of said items ar accumulated therein;
  (e) sorting said items discharged from said receiving means to a plurality of pockets;
  (f) selecting which one of said pockets contains items whose weight, when combined with said first quantity of items, most nearly equals said predetermined weight; and,
  (g) discharging said items from said selected pocket into said package on command from said computation means, said sorting of said items to said plurality of pockets taking place at substantially the same time as said selecting and discharging of said items from said selected pocket.

13. A device for filling a package with a predetermined weight of irregularly shaped, different sized items, comprising:

controller means;

first weighing means for passing to said controller means information relating to the weight of a first quantity of items in said package, said weight of said first quantity of items being less than said predetermined weight;

a pair of receiving means each adapted for accumulating a predetermined quantity of additional items for subsequent passage to said package, each of said receiving means adapted to discharge said additional items upon receipt of a signal from said controller means;

second weighing means for passing to said controller means information relating to the weight of said predetermined quantities of additional items accumulated in each of said receiving means a pair of stations, one station disposed below one of said receiving means and the other of said stations disposed below the other of said receiving means, each station having an upper sorting level and a lower sorting level, said upper sorting levels comprising a plurality of upper gates and a plurality of upper pockets each associated with a corresponding one of said upper gates, and said lower sorting levels comprising a plurality of lower pockets each associated with and disposed below one of said upper gates;

each of said upper pockets adapted to receive said predetermined quantity of additional items from said corresponding receiving means at a receiving position and transfer said items to said associated upper gate upon receipt of a signal from said controller means, each of said upper gates adapted to open upon receipt of a signal from said controller means thereby causing said corresponding items transferred to said upper gate by said associated upper pocket to be discharged into said associated lower pocket, and each of said lower pockets adapted to transfer said corresponding items to a discharge opening upon receipt of a control signal;

a pair of transfer means, one of said transfer means disposed below one of said stations and the other of said transfer means disposed below the other of said stations, each of said transfer means adapted to receive said items discharged from said corresponding discharge opening and transfer said items to said package;

said controller means passing a control only to a selected one of said lower pockets of one of said stations and a selected one of said lower pockets of the other of said stations whose items, when combined with said first quantity of items in said package, most nearly equals said predetermined weight.

14. The device of claim 13 further comprising a pair of feeding means, one feeding means for feeding said items one at a time to one of said receiving means and the other of said feeding means for feeding items one at a time to the other of said receiving means.

15. The device of claim 14 wherein each of said receiving means comprises a funnel having a funnel gate which opens upon receipt of said signal from said controller means.

16. The device of claim 14 wherein said controller means passes said signal to said receiving means at a selected time after said predetermined quantities of additional items have been accumulated by said receiving means.

17. The device of claim 14 wherein said controller means passes said signal to a selected one of said upper pockets of one of said stations which is empty and a selected one of said upper pockets of the other of said stations which is empty.

18. The device of claim 14 wherein said controller means passes said signal to said upper gates at a selected time after said associated upper pocket has transferred said predetermined quantity of additional items to said upper gate.

19. The device of claim 18 wherein said signal is passed when said associated lower pocket is empty.

20. The device of claim 14 wherein each of said transfer means comprises a transfer pocket and a gate, said transfer pockets adapted to receive said items discharged from said corresponding discharge opening and transfer said items to said gate, said gates adapted to open thereby causing said associated predetermined quantity of additional items to be discharged from said transfer means to said package.

21. The device of claim 20 wherein each of said transfer pockets includes means to prevent additional items from being discharged from said corresponding discharge opening while said transfer pocket is transferring said associated predetermined quantity of additional items to said corresponding gate.

22. The device of claim 21 wherein each of said gates is adapted to open at a selected time after said associated transfer pocket has transferred said associated predetermined quantity of additional items to said gate.

23. A device for filling a package with a predetermined weight of chicken parts comprising:
 conveyor means for moving said package along a path, said package containing a first plurality of chicken parts having a weight less than said predetermined weight;
 package weighing means, disposed along said path, for developing a package weight signal indicative of the weight of said first plurality of chicken parts;
 first funnel means adapted to accumulate chicken parts and discharge said chicken parts when a predetermined quantity of chicken parts are accumulated therein;
 first feeding means for sequentially feeding chicken parts to said first funnel means;
 first part weighing means for developing first part weight signals, said first part weighing means associated with said first feeding means such that the first part weight signals are indicative of the weight of each chicken part being fed to said first funnel means;
 a first plurality of upper pockets and a first plurality of gates each associated with a corresponding one of said first upper pockets;
 a first plurality of upper actuation means, each associated with a corresponding one of said first upper pockets, responsive to a signal to cause said associated first upper pocket to receive said predetermined quantity of chicken parts from said first funnel means and transfer said chicken parts to said associated first gate;
 a first plurality of gate actuators, each associated with a corresponding one of said first gates, responsive to a signal to cause said associated first gate to open and discharge said chicken parts transferred to said first gate by said associated first upper pocket;
 a first plurality of lower pockets each associated with a corresponding one of said first gates adapted to receive said chicken parts discharged by said associated first gate;
 a first plurality of lower actuation means each associated with a corresponding one of said first lower pockets, responsive to a first control signal to cause said associated first lower pocket to transfer said chicken parts deposited therein to a first discharge opening;
 a first transfer means adapted to receive said chicken parts discharged from said first discharge opening and transfer said chicken parts to said package as said package passes through a filling position along said conveyor;
 means for developing a position signal when the package reaches a predetermined position, prior to the time said package passes through said filling position;
 computation means, responsive to said package weight signal, said first part weight signals and said position signal, for passing said first control signal at a selected time, prior to the time said package passes through said filling position, only to a selected one of said first lower actuation means associated with the one of the first lower pockets which contains selected chicken parts which, when combined with said first plurality of chicken parts, most nearly equals said predetermined weight, such that said selected additional chicken parts are transferred via said first transfer means into said package.

24. The device of claim 23 further comprising:
 second funnel means adapted to accumulate chicken parts and discharge said chicken parts when a predetermined quantity of chicken parts are accumulated therein;
 second feeding means for sequentially feeding chicken parts to said second funnel means;
 second part weighing means for developing second part weight signals, said second part weighing means associated with said second feeding means such that, the second part weight signals are indicative of the weight of each chicken part being fed to said second funnel means;
 a second plurality of upper pockets and a second plurality of gates each associated with a corresponding one of said second upper pockets;
 a second plurality of upper actuation means, each associated with a corresponding one of said second upper pockets, responsive to a signal to cause said associated second upper pocket to receive said predetermined quantity of chicken parts from said second funnel means and transfer said chicken parts to said associated second gate;
 a second plurality of gate actuators, each associated with a corresponding one of said second gates, responsive to a signal to cause said associated second gate to open and discharge said chicken parts transferred to said second gate by said associated second upper pocket;
 a second plurality of lower pockets each associated with a corresponding one of said second gates adapted to receive said chicken parts discharged by said associated second gate;
 a second plurality of lower actuation means each associated with a corresponding one of said second lower pockets, responsive to a second control signal to cause said associated second lower pocket to transfer said chicken parts deposited therein to a second discharge opening;

a second transfer means adapted to receive said chicken parts discharged from said second discharge opening and transfer said chicken parts items to said package as said package passes through said filling position along said conveyor;

said computation means further responsive to said second part weight signals for passing said first and second control signals at a selected time, prior to the time said package passes through said filling position, only to a selected one of said first lower actuation means associated with the one of the first lower pockets and a selected one of said second lower actuation means associated with the one of the second lower pockets which contain selected chicken parts which, when combined with said first plurality of chicken parts, most nearly equals said predetermined weight, such that said selected additional chicken parts are transferred via said first and second transfer means, respectively, into said package.

25. The device of claim 24 wherein said first upper pockets are arranged in a circular pattern around a first receiving position such that said first upper pockets receive said predetermined quantity of chicken parts from said first funnel means at said first receiving position and said second upper pockets are arranged in a circular pattern around a second receiving position such that said second upper pockets receive said predetermined quantity of chicken parts from said second funnel means at said second receiving position.

26. The device of claim 24 wherein said first lower pockets are arranged in a circular pattern around said first discharge opening and said second lower pockets are arranged in a circular pattern around said second discharge opening.

27. The device of claim 24 wherein said means for developing said position signal comprises a photo cell positioned along said conveyor means a predetermined distance in advance of said filling position.

28. The device of claim 24 further including first sensing means positioned along said first feeding means for developing first counter signals indicative that a chicken part has dropped into said first funnel means and further including second sensing means positioned along said second feeding means for developing second counter signals indicative that a chicken part has dropped into said second funnel means.

29. The device of claim 24 wherein said chicken parts being fed by said first feeding means are a different type of chicken part than said chicken parts being fed by said second feeding means.

30. The device of claim 24 wherein said first and second transfer means each comprise a transfer pocket and a gate, said transfer pockets responsive to a signal to transfer said chicken parts discharged from said respective discharge opening to said gate, said gates responsive to a signal to cause said gate to open thereby causing said chicken parts to be dropped into said package.

31. The device of claim 30 wherein said signals to said transfer pockets are passed via a first timing circuit and said signals to said gate are passed via a second timing circuit from said computation means.

32. The device of claim 31 wherein said second timing circuit is adapted to cause said gates to open at a selected time after said chicken parts transferred thereto have come to rest.

* * * * *